(12) United States Patent
Ramaiah et al.

(10) Patent No.: US 8,566,467 B2
(45) Date of Patent: Oct. 22, 2013

(54) DATA PROCESSING SYSTEM AND METHOD

(75) Inventors: Chaitra Maraliga Ramaiah, Bangalore Karnataka (IN); Venkataraman Kamalaksha, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 12/175,252

(22) Filed: Jul. 17, 2008

(65) Prior Publication Data

US 2009/0031063 A1 Jan. 29, 2009

(30) Foreign Application Priority Data

Jul. 23, 2007 (IN) .......................... 1593/CHE/2007

(51) Int. Cl.
*G06F 15/16* (2006.01)
(52) U.S. Cl.
USPC ........... 709/230; 709/205; 709/239; 709/103; 709/233; 710/105
(58) Field of Classification Search
USPC .......... 710/105; 709/230, 205, 239, 250, 103, 709/233
See application file for complete search history.

(56) References Cited

U.S. PATENT DOCUMENTS

| | | | | |
|---|---|---|---|---|
| 6,393,026 B1 * | 5/2002 | Irwin | ............................ | 370/401 |
| 6,763,519 B1 * | 7/2004 | McColl et al. | ................ | 718/100 |
| 6,956,818 B1 * | 10/2005 | Thodiyil | ....................... | 370/230 |
| 7,020,700 B1 * | 3/2006 | Bennett et al. | ................ | 709/224 |
| 7,447,166 B1 * | 11/2008 | Kaluve et al. | ................ | 370/254 |
| 7,735,088 B1 * | 6/2010 | Klausler | ....................... | 718/108 |
| 7,797,460 B2 * | 9/2010 | Kinsey et al. | ................ | 709/250 |
| 2002/0133608 A1 * | 9/2002 | Godwin et al. | ............... | 709/230 |
| 2002/0133630 A1 * | 9/2002 | Navare et al. | ................ | 709/250 |
| 2002/0194370 A1 * | 12/2002 | Voge | ............................. | 709/239 |
| 2003/0018807 A1 * | 1/2003 | Larsson et al. | ............... | 709/238 |
| 2003/0204552 A1 * | 10/2003 | Zuberi | ......................... | 709/103 |
| 2004/0176059 A1 * | 9/2004 | Hayem et al. | ............. | 455/168.1 |
| 2005/0124331 A1 * | 6/2005 | Munje et al. | ................. | 455/418 |
| 2005/0138198 A1 * | 6/2005 | May | .............................. | 709/233 |
| 2007/0014231 A1 * | 1/2007 | Sivakumar et al. | ........... | 370/216 |
| 2008/0181220 A1 * | 7/2008 | Babbar et al. | ................ | 370/389 |
| 2008/0291906 A1 * | 11/2008 | Chigurupati et al. | ......... | 370/356 |

OTHER PUBLICATIONS

Annie Foong et al., Improved Linux* SMP Scaling: User-directed Processor Affinity,Mar. 12, 2010, Entire document.
Ram Huggahalli et al.,Direct Cache Access for High Bandwidth Network I/O, IEEE 2005, entire document.
Murali Rangarajan et al.,TCP Servers: Offloading TCP Processing in Internet Servers. Design, Implementation, and Performance, Rutgers University Technical Report, DCS-TR-481, Mar. 2002, entire dcument.
Shourya P. Bhattacharya et al.,A Measurement Study of the Linux TCP/IP Stack Performance and Scalability on SMP systems*, Communication System Software and Middleware,Comsware 2006,First International Conference, pp. 1-10, Aug. 7, 2006.

* cited by examiner

*Primary Examiner* — Thuong Nguyen

(57) ABSTRACT

Embodiments of the present invention relate a data processing method comprising executing a first application on a first processor of a multiprocessor system and implementing, on the first processor, a first protocol stack supporting a first communication channel, bearing first communication data, associated with the first application; and executing a second application on a second processor of the multiprocessor system and implementing, on the second processor, a second protocol stack supporting a second communication channel, bearing second communication data, associated with the second application.

13 Claims, 4 Drawing Sheets

DATA PROCESSING SYSTEM AND METHOD

RELATED APPLICATIONS

This patent application claims priority to Indian patent application serial number 1593/CHE/2007, having title "Data Processing System and Method", filed on 23 Jul. 2007 in India (IN), commonly assigned herewith, and hereby incorporated by reference.

BACKGROUND TO THE INVENTION

Embodiments of the present invention relate to a data processing system and method.

Typically, one processor within a multiprocessor system is assigned the task of implementing a protocol stack to support network communications via a network interface such as, for example, a network interface card (NIC). The single assigned processor services any NIC interrupts and also deals with passing the received data up through the protocol stack until it can be delivered to an appropriate application. The appropriate application might be executing on the same CPU as that used to realise the protocol stack or on a different CPU to that used to implement the protocol stack. In the latter case, the CPU that initially handled the NIC interrupt also passes the data extracted from the received packet to the appropriate application that is executing on the other CPU.

BRIEF DESCRIPTION OF THE DRAWINGS

Embodiments of the present invention will now be described, by way of example only, with reference to the following drawings in which.

DESCRIPTION

Figure 1:
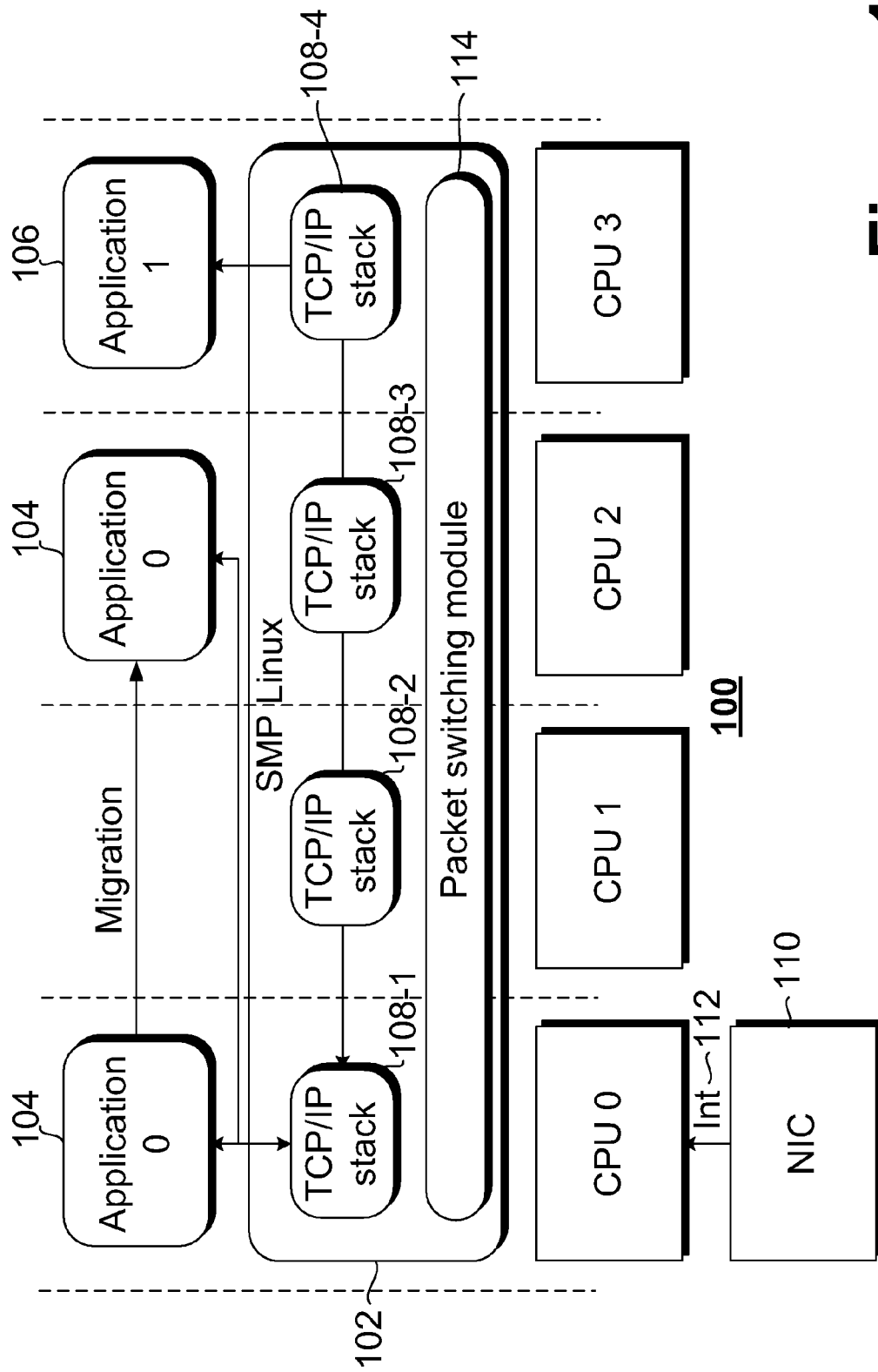
FIG. 1 shows a multiprocessor system according to an embodiment.

Referring to FIG. 1, there is shown a multiprocessor system 100 according to an embodiment of the present invention. The multiprocessor system 100 comprises four CPUs; namely CPU 0, CPU 1, CPU 2 and CPU 3. The multiprocessor system 100 also comprises a multiprocessor operating system 102. In the embodiment illustrated, the multiprocessor operating system 102 is SMP Linux. Any one or more of the CPUs can be used to execute one or more applications. In the illustrated embodiment, CPU 0 is arranged to execute a first application 104 while CPU 3 is shown as executing a second application 106.

It will be appreciated that the multiprocessor system has been described with reference to having four processors. However, some other number of processors can be used. In the illustrated embodiment, the processors are shown as having or as defining respective partitions as can be appreciated from the dashed lines. Similarly, although the embodiments described herein refer to SMP Linux, embodiments can be realised that use some other operating system.

The multiprocessor operating system 102 comprises a number of communication protocol stacks 108-1 to 108-4. In the illustrated embodiment, the communication protocol stacks 108 are TCP/IP stacks. However, embodiments of the present invention can be realised using other communication protocol stacks. Processing data received from a network (not shown), via a network interface card (NIC) 110, is instigated via an interrupt 112 generated by the NIC 110. The interrupt 112 causes the first CPU, that is, CPU 0, to call an interrupt service routine 114 arranged to service the interrupt at an appropriate point in time where the received data is passed to an appropriate one of the stacks 108-1 to 108-4.

Figure 2:
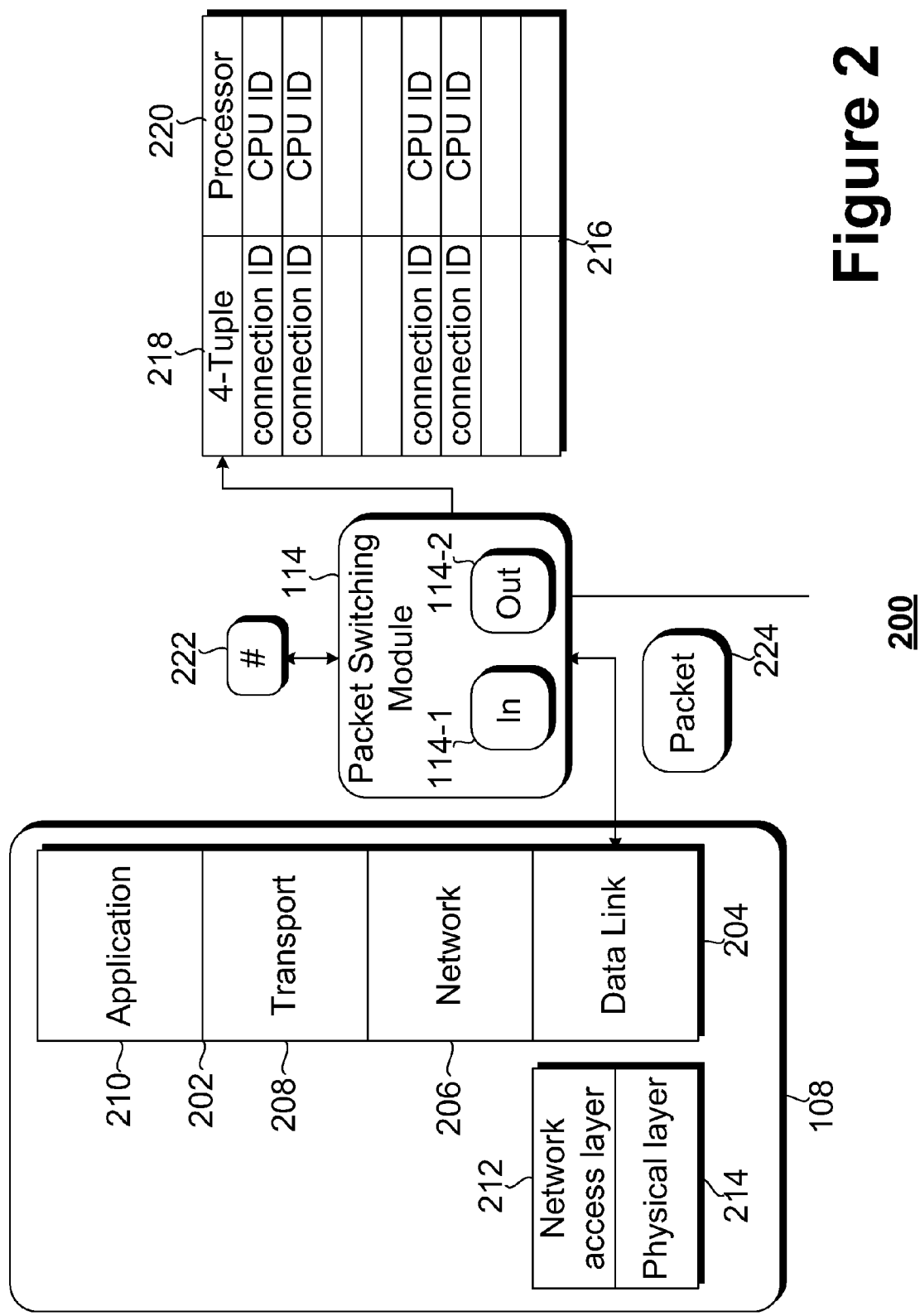
FIG. 2 shows a protocol stack according to an embodiment.

FIG. 2 shows an architecture 200 associated with one of the communication protocol stacks 108. The same architecture is realised for each, or at least a selectable number of, the protocol stacks. As indicated above, a TCP/IP stack 202 is illustrated. The TCP/IP stack 202 comprises four layers; namely, a data link layer 204, a network layer 206, a transport layer 208 and an application layer 210. One skilled at the art appreciates that embodiments of such a TCP/IP stack 202 might comprise five layers in which the data link layer 204 is divided into a network access layer 212 and a physical layer 214. The operation of, or the implementation of, such a four or five layered model is well known to those skilled in the art and will not be described in detail.

FIG. 2 also shows the interrupt service routine 114 that is invoked by CPU 0 in response to the interrupt 112 from the NIC 110. The interrupt service routine 114, in the illustrated embodiment, is realised in the form of a packet switching module. The packet switching module 114 is responsible for directing any network data received via the network interface card 110 to one of the four CPUs. The packet switching module 114 is arranged to direct the received network data according to redirection data contained within a data structure 216. In the illustrated embodiment, the data structure 216 is a table. One skilled in the art, however, appreciates that other data structures may be used to realise embodiments of the present invention. The data structure 216 comprises sets of connection identification data 218 that are related to respective CPU identification data 220 associated with one or more of the CPUs. The connection identification data 218 is used to identify a communication connection associated with an application that is communicating, via the application layer 210, with another network entity (not shown). The network entity can be another software or hardware network entity such as, for example, another machine, another application, or another level of implementation of a TCP/IP stack, or any other communication protocol stack.

The connection identification data 218 is contained in data or packets that are passed from layer to layer within the TCP/IP communication protocol stack 108 in at least one direction and, preferably, both directions of the stack 108. The CPU identification data 220 reflects or identifies the CPU of the CPUs CPU 0 to CPU 3 associated with the application that requested establishment of, or that is using, the communication connection associated with the connection identification data. Therefore, the data structure 216 will contain one or more pairs of connection identification data 218 and CPU identification data at 220 that correspond with respective connections used by applications, or other software entities, being executed by the CPU or CPUs associated with the CPU identification data 220.

The packet switching module 114 can use any means of accessing and storing the data stored within the data structure 216. In an embodiment, the packet switching module 114 uses a hash function 222 to generate an index into the data structure 216 via which a new entry position within the data structure 216 can be established for storing a connection ID and CPU ID pair or via which an existing entry in the data structure 216 can be accessed.

Although the embodiment presently described makes reference to the application being associated with a connection, embodiments are not limited to such an arrangement. Embodiments can be realised in which the connection data is associated with any software entity such as, for example, any layer, or combination of layers, of the communication protocol stack 108, any other communication protocol stack realisation, or any other software entity whether at or above the application layer, forming part of the operating system, or forming part of firmware used by or executable by the multiprocessor system 100. Therefore, while the present embodiment has been described with reference to the packet switching module 114 intercepting communication data at the data link layer 204 of the TCP/IP communication protocol stack 108, embodiments are not limited to such an arrangement. Embodiments can be realised in which the communication data identifying an associated connection is extracted at any layer of a communication protocol stack or is identified in any other way.

Data traversing the stack, that is, data that is passed down the communication protocol stack or up the communication protocol stack, is also always, or selectively, processed by the packet switching module 114. The packet switching module 114 processes the data traversing the stack 108 with a view to populating the data structure 216 with the pairs of connection identification data 218 and CPU identification data 220.

When communication data is being passed down, or has been passed down, the protocol stack 108 from an application to a connection, the packet switching module 114 stores the connection identification data 218 and CPU identification data 220 associated with the communication data. When communication data is being passed up, or is intended to be passed up, a respective protocol stack 108, connection identification data is extracted from the communication data by the packet switching module 114, or is otherwise identified by the packet switching module 114, and used to identify the CPU corresponding to the CPU identification data 220 indexed by the extracted connection identification data 218. The communication data is forwarded to the communication protocol stack associated with the CPU corresponding to the indexed CPU identification data 220.

Every data packet output by one of the applications 104 and 106 via their respective protocol stacks, is associated with a connection. There are four addresses in an IP data packet that are unique to a connection. The four unique addresses are (1) a source IP address, (2) a destination IP address, (3) a source port number and (4) a destination port number. The four unique addresses represent a realisation, or an embodiment, of connection identification data 218 associated with a connection. Although this embodiment has been described with reference to using the four unique attributes, embodiments are not limited to such addresses. Embodiments can be realised in which the connection identification data 218 is implemented using any data that uniquely associates a connection with a CPU on which the application using the connection is being executed, is scheduled to be executed or has been previously executed.

It will be recalled from the above that the data traversing the stack can be selectively processed by the packet switching module 114. Embodiments can be realised in which the data structure 216 is populated, updated or otherwise modified or maintained in response to migration of an application from one CPU to another CPU of the multiprocessor system. Referring again to FIG. 1, it can be appreciated that the first application 104 has been migrated from the first CPU, CPU 0, to the third CPU, CPU 2. Therefore, the communication protocol stack 108-3 associated with the third CPU will be used to process communication data originating from, and destined for, or otherwise associated with, the first application 104.

Suitably, the packet switching module 114 updates at least one of the connection identification data 218 and the CPU identification data 220 appropriately to reflected the new relationship between any connection associated with the first application 104 and the CPU upon which the first application 104 is scheduled to be, or is being, executed. If the data structure 216 does not contain connection identification data 218 and CPU identification data 220 associated with the application 104, respective identification data 218 and CPU identification data 220 are created accordingly in response to the first time inbound communication data is received that is destined for the application 104 or in response to the first time the application 104 generates outbound communication data.

The packet switching module 114 comprises an inbound communication data processor or process 114-1 and an outbound communication data processor or process 114-2 for processing inbound communication data and outbound communication data respectively. The processors 114-1 and 114-2 operate according to FIGS. 3 and 4, which are described below.

Figure 3:
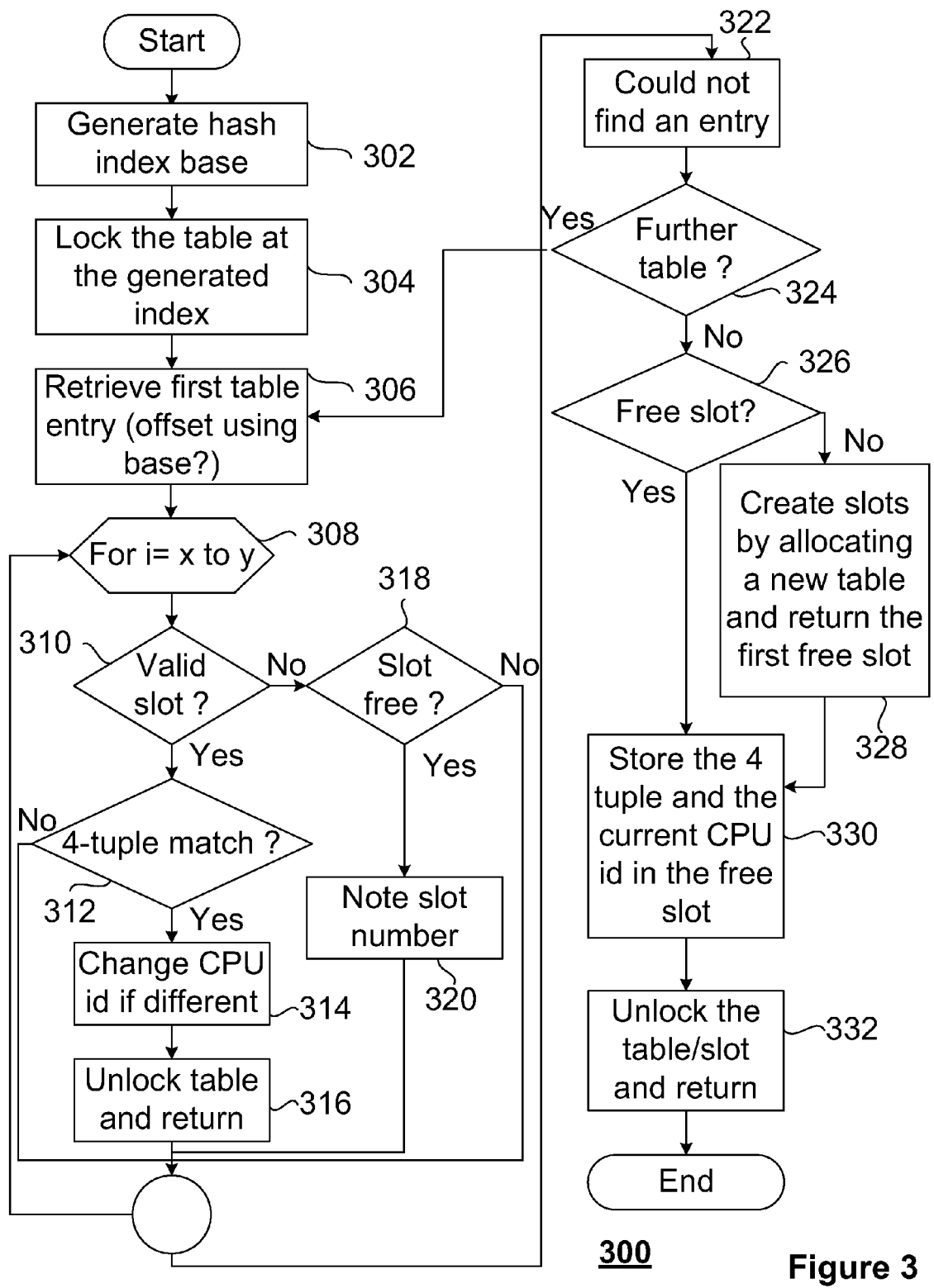
FIG. 3 shows a flowchart for processing outbound data packets.

Referring to FIG. 3, there is shown a flowchart 300 of the process implemented by the outbound communication data processor 114-2. At step 302, the outbound data processor 114-1 passes communication data 224 to the hash function 222 to generate a hash index associated with an entry in the data structure 216, or at least to identify a portion of the data structure 216, at which corresponding connection identification data 218 and processor identification data 220 are stored or can be stored. The portion of, slot or entry in, the data structure 216 corresponding to the hash index is locked at step 304. The entry is locked to ensure that it is not overwritten by data relating to a connection that is hosted via one of the other processors.

At step 306, the hash index is applied to the data structure 216 to identify a base or first index of a portion of the data structure from which a search of that portion is instigated to locate an appropriate four-tuple-cpu-id pair 218 and 220.

Step 308 is used to realise a "for-loop" via which the slots within, or at least within an indexed portion of, the data structure 218 are searched. A determination is made at step 310 as to whether or not the $i^{th}$ slot or entry in the data structure 216 comprises a valid four-tuple-cpu id pair that is, a valid entry. The validity or otherwise of a four-tuple-cpu-id pair can be implemented using any of a number of techniques such as, for example, using a "dirty bit", or other indication, indicating whether or not a particular entry of the data structure is valid.

If the slot contains a valid entry, a determination is made at step 312 as to whether or not the connection identification data of the packet 224 matches the connection identification data 218 stored within the data structure 216. If there is such a match, the CPU identification data 220 associated with the matched connection identification data 218 is updated, if necessary, to reflect the CPU upon which the protocol stack associated with the communication data 224 is implemented at step 314. Once the data within the data structure 216 has been maintained at step 314, the data structure, or portion thereof, is unlocked and the process of FIG. 3 is exited at step 316.

Returning to step 310, if the data within the $i^{th}$ entry is not valid, a determination is made at step 318 as to whether or not the slot is free. If the slot is not free, that is, if it contains a connection identification data-CPU identification data pair, processing resumes at step 308 where the value of i is incremented according to the for-loop as is conventional. However, if the slot is free, access data for accessing the slot is noted. For example, a slot number is noted The above for-loop executes until it is either excited at step 316 or all of the elements within the currently indexed portion of the data structure have been considered, which terminates the for-loop in the normal course of events.

The for-loop terminating in the normal course of events results in step 322 being executed, where it is optionally noted that an entry corresponding to the connection identification of the packet 224 could not be identified.

A determination is made at step 324 as to whether or not the data structure 216 comprises further sub-data structures such as, for example, further tables, slots or other portions, to be traversed. Processing resumes at step 306 where the first entry of the next table, slot or other portion of the data structure, of any such further tables, slots or other portions of the data structure, to be traversed is retrieved if the determination is positive.

If the determination at step 324 is negative, a determination is made at step 326 as to whether or not a free slot was located during the for-loop. If a free slot was not located, such free slot, further table or other portion of the data structure is created at step 328 and the first slot or entry of the newly created portion of the table is noted.

The connection identification data and the cpu identification data are stored in the free slot at step 330. The data structure is unlocked at step 332 and normal processing resumes thereafter, which, in this context, means the regular protocol processing of this packet 224 that involves the packet being output to the network interface card for processing in the usual way.

Figure 4:
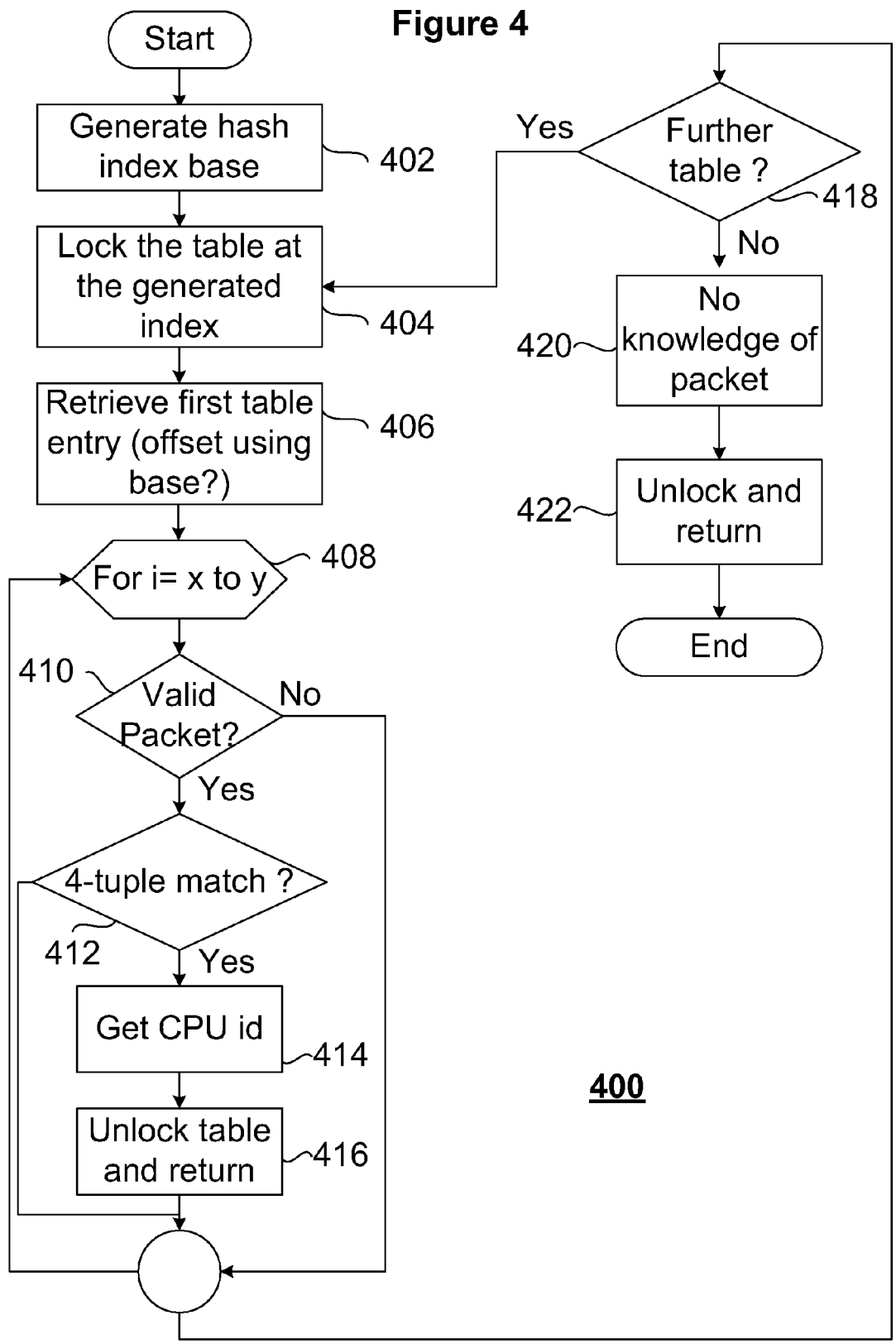
FIG. 4 shows a flowchart for processing inbound data packets.

Referring to FIG. 4, there is shown a flowchart 400 of the processing step undertaken by the inbound communication data processor 114-1. At step 402, a hash value is generated using the hash function 222 to obtain a base index into the data structure 216. A portion of the data structure 216 such as, for example, a table having a base corresponding to the generated hash value is locked at step 404. The first entry of that portion of the data structure 216 is retrieved at step 406. A for-loop is established at step 408 that is capable of stepping through each entry within the accessed portion of the data structure 216 corresponding to the generated hash value. A determination is made at step 410 as to whether or not the $i^{th}$ slot comprises valid data, that is, a valid four-tuple-cpu id pair. If the $i^{th}$ entry of the data structure 218 does not contain valid data, processing, in effect, resumes at step 408, that is, the next iteration of the for-loop is undertaken.

If the determination at step 410 is positive, a determination is made at step 412 as to whether or not connection identification data associated with the communication data 224 matches the connection identification data of the current slot of the data structure 216, or at least within a portion of the data structure 216. If the determination is negative, processing resumes, in effect, at step 408 where the next iteration of the for-loop is undertaken. If a match for the connection identification data associated with the communication data 224 is found within the data structure 216, the CPU identification data 220 corresponding to the matching connection identification data 218 is noted at step 414. The table is unlocked at step 416 and the for-loop is exited, which in effect, exits or terminates the process defined by the flowchart of FIG. 4, following which the packet 224 is passed up the appropriate protocol stack, hosted by the identified CPU, to an addressed application.

Following completion of the for-loop, a determination is made at step 418 as to whether or not there are further tables or other portions of the data structure 218 to be searched. If there are no further tables to be searched, processing resumes at step 420 where an error message is optionally output indicating that the system 100 has no knowledge of the connection associated with the communication data 224 whereupon the table or data structure is unlocked and processing returns from the packet switching module or, more particularly, from the inbound communication data processor 114-1 at step 422. Optionally, an error message can be returned at step 422. Similarly, any return instruction executed at step 416 would also return the appropriate CPU identification data 220. Once the CPU identification data 220 corresponding to the incoming communication data 224 has been identified, that communication data 224 can be directed to the communication protocol stack 108 associated with the identified CPU.

Embodiments of the present invention have the advantage of relieving the CPU within a multiprocessor system that has been assigned the task of the implementing the communication protocol stack on behalf of applications running on other CPUs of that processing burden. This, in turn, has the advantage that CPUs of the multiprocessor system are able to respond more quickly to interrupts received from the NIC 110. This follows, at least in part, from its other processing burden, in the form of implementing the protocol stack on behalf of applications running on other processors, being reduced. Still further, ensuring that inbound communication data destined for an application is directed to the communication protocol stack implemented on the CPU associated with that application to which the communication data is directed has the advantage that the probability of a cache miss being generated is at least reduced. This, in turn, improves overall processing efficiencies in terms of, for example, reducing the amount of time needed to process data via a protocol stack. Having such a reduction in time might also allow the responsiveness of the CPU to NIC interrupts to be improved.

It will be appreciated that embodiments of the present invention can be realised in the form of hardware, software or a combination of hardware and software. It will be appreciated that embodiments of the present invention can be realised in the form of software are known as software implementations or are known as being software implemented embodiments. Embodiments can also be realised in the form of hardware are known as hardware implementations or are known as being hardware implemented embodiments. Embodiments can be realised using a combination of hardware and software. Any such software is stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that such storage devices and storage media are embodiments of machine-readable storage that are suitable for storing a program or programs that, when executed, implement embodiments of the present invention. Accordingly, embodiments provide a program or code comprising instructions arranged to implement a system or method as described herein or as claimed herein and machine readable storage storing such a program or such code. Still further, embodiments of the present invention may be conveyed electronically via any medium such as a communication signal carried over a wired or wireless connection and embodiments suitably encompass the same.

The above embodiments have been described with reference to using a hash to generate a base index into the data structure and then searching a corresponding portion of the data structure defined by the base index for a four-tuple-cpu id pair. However, embodiments are not limited thereto. Embodiments can be realised in which the hash generates a unique index for every four-tuple, which leads to a unique corresponding entry in the data structure from which data of the four-tuple-cpu-id pair can be retrieved or at which data of the four-tuple-cpu-id pair can be stored.

The invention claimed is:

1. A data processing method comprising
processing, with a first protocol stack implemented executing on a first processor of a multi-processor system, communications directed to and from a first application executed on the first processor, the first processor being identified by a first processor identifier;
migrating the first application from the first processor to a second processor of the multiprocessor system for execution on the second processor, the second processor implementing a second protocol stack processing communications directed to and from applications executed on the second processor, the second processor being identified by a second processor identifier;
transmitting an outbound communication from the first application to an entity external to the multi-processor system after migration of the first application, a connection identifier in the outbound communication being associated, in a data structure, with the first processor identifier prior to migration of the first application;
in response to transmission of the outbound communication, extracting the connection identifier from the outbound communication, and updating the data structure to associate the connection identifier with the second processor identifier;
accessing the data structure to obtain the second processor identifier in response to an inbound communication directed from the external entity to the first application; and
directing the inbound communication to the second protocol stack based on the second processor identifier.

2. A method as defined in claim 1 wherein the outbound communication is processed by the second protocol stack and the second processor identifier is determined based on the outbound communication being processed by the second protocol stack.

3. A method as defined in claim 1, wherein the connection identifier identifies a connection by which the first application communicates with the external entity.

4. A multiprocessor system comprising:
an operating system of a multiprocessor system, the operating system comprising a first protocol stack and a second protocol stack;
a first processor to execute a first application, the first processor to implement the first protocol stack, the first protocol stack to process communications directed to and from applications executed on the first processor, and the first processor being identified by a first processor identifier;
a second processor to execute applications a second application and to implement the second protocol stack, the second protocol stack processing communications directed to and from the applications executed on the second processor, and the second processor being identified by a second processor identifier; and
a packet switch to:
transmit an outbound communication from the first application to an entity external to the multi-processor system after the first application has been migrated from the first processor to the second processor, a connection identifier in the outbound communication being associated, in a data structure, with the first processor identifier prior to migration of the first application
in response to transmission of the outbound communication, extract the connection identifier from the outbound communication, and update the data structure to associate the connection identifier with the second processor identifier;
direct an inbound communication received from an entity external to the multi-processing system to the second protocol stack based on the second processor identifier.

5. A method as defined in claim 4, wherein the inbound communication includes the connection identifier, the method further comprising:
extracting the connection identifier from the inbound communication, wherein the extracted connection identifier is used to obtain the second processor identifier from the data structure.

6. A system as defined in claim 4, wherein the outbound communication is processed by the second protocol stack, and the second processor identifier is determined based on the outbound communication being processed by the second protocol stack.

7. A system as defined in claim 4 wherein the packet switch is further to extract the connection identifier from the inbound communication and use the connection identifier to obtain the second processor identifier from the data structure.

8. The system of claim 4 wherein the connection identifier includes an address of the external entity.

9. A tangible machine readable storage device comprising machine readable instructions that, when executed, cause a machine to at least:
process, with a first protocol stack implemented execute a first application on a first processor of a multiprocessor system communications directed to a first application executed on the first processor, the first processor being identified by a first processor identifier;
migrate the first application from the first processor to a second processor implementing a second protocol stack, the second protocol stack to process communications directed to and from applications executed on the second processor , and the second processor being identified by a second processor identifier;
transmit an outbound communication from the first application to an entity external to the multi-processor system after migration of the first application, a connection identifier in the outbound communication being associated, in a data structure, with the first processor identifier prior to migration of the first application;
in response to transmission of the outbound communication, extract the connection identifier from the outbound communication, and update the data structure to associate the connection identifier with the second processor identifier;
access the data structure to obtain the second identifier in response to an inbound communication directed from the external entity to the first application; and
direct the inbound communication to the second protocol stack based on the second processor identifier.

10. A machine readable storage device as defined in claim 9 wherein the outbound communication is processed by the second protocol stack and the second identifier is determined based on the outbound communication being processed by the second protocol stack.

11. A machine readable storage device as defined in claim 9 wherein the connection identifier identifies a connection by which the first application communicates with the external entity.

12. A machine readable storage device as defined in claim 9 wherein the inbound communication includes the connection identifier and the instructions further cause the machine to extract the connection identifier from the inbound communication, the connection identifier to facilitate obtaining the second identifier from the data structure.

13. A machine readable storage device as defined in claim 9 wherein the connection identifier includes an address of the external entity.

* * * * *